March 10, 1959 W. W. WELLBORN ET AL 2,877,088
METHOD AND APPARATUS FOR MAKING URANIUM-HYDRIDE COMPACTS
Filed April 3, 1951
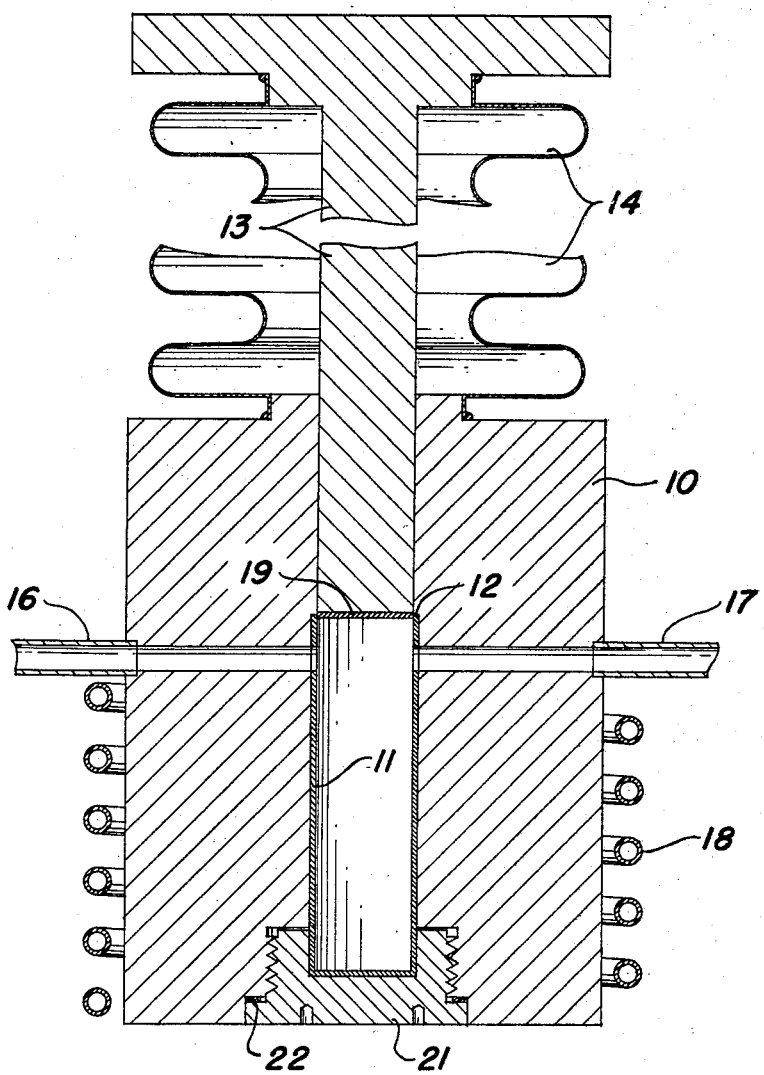
WITNESSES:
Ralph Carlisle Smith
Kermith F. Ross
INVENTORS:
WILLIAM W. WELLBORN
JOHN R. ARMSTRONG
BY Roland A. Anderson
Attorney

United States Patent Office 2,877,088
Patented Mar. 10, 1959

2,877,088
METHOD AND APPARATUS FOR MAKING URANIUM-HYDRIDE COMPACTS

William W. Wellborn and John R. Armstrong, Los Alamos, N. Mex., assignors to the United States of America as represented by the United States Atomic Energy Commission Application April 3, 1951, Serial No. 219,064

7 Claims. (Cl. 23—14.5)

This invention relates to a method and apparatus for forming pyrophoric compounds, compressing them into compacts in a container and sealing the container in a continuous operation out of contact with air; more particularly, it relates to a method and apparatus for making canned compacts of pyrophoric hydrides out of contact with the air.

As a result of the extensive development of neutronic research, combinations of hydrogen and metals of the second rare earth series such as uranium and plutonium have become of great importance. For example, hydrogeneous material is effective in slowing neutrons to a value at which some of the second rare earth series metals often have large cross sections for neutrons so that the combination is useful in many neutronic systems. The hydride of a particular metal has often proved to be the optimum combination of the metal and hydrogen for neutronic systems, as this combination furnishes a high density product.

In spite of the above recognized advantage of the hydrides of metals of the second rare earth series for use with neutronic systems, it has not been possible to use them extensively in this application prior to this time, because no entirely satisfactory method, prior to this invention, has been developed for making compacts thereof. Heretofore, the chief method of making compacts of the hydrides of the above metals has been by compressing the hydride particles after removing them from the apparatus in which the hydride is formed. This involves exposure of the powder to the air and, because of the high pyrophoricity of the hydride powder, this procedure has been highly unsatisfactory.

Since no method has been available which eliminates the disadvantages resulting from the pyrophoric characteristics of the hydride, the advantages of making, compacting and sealing the compound in a container in one continuous operation out of contact with the air are apparent. However, no method, prior to this invention, has been available for producing a canned compact of high density and high purity.

It is therefore an object of this invention to provide a method and apparatus for making compounds, compressing them into compacts of high density and sealing them in a container in one continuous operation performed out of contact with the air.

It is another object of this invention to provide a method and apparatus for producing canned pyrophoric hydride compacts of high purity and density in a continuous operation performed out of contact with the air.

It is a further object of this invention to provide a method and apparatus for producing canned compacts of high density and purity from hydrides of the second rare earth series metals in a continuous operation performed out of contact with air.

The above and other objects are accomplished by enclosing a metal of the second rare earth series in a container of the desired conformation, removing air from the container and the metal, heating the container to the required temperature, introducing sufficient hydrogen into the container under pressure to react with all the metal present to form the hydride, compressing the hydride formed with mechanical pressure at an elevated temperature and sealing the compacted hydride in the container without its removal therefrom.

The invention is best understood by reference to the following description taken in connection with the drawing which forms a part of this specification.

The accompanying drawing is a vertical section of a preferred embodiment of the apparatus of the invention.

Referring to the drawing, 10 is a die body made of steel or other suitable metallic material. The die body is provided with an inner chamber into which the hydride container 11 of copper or other suitable material is fitted. The inner chamber is undercut as shown at 12, thus providing upper and lower sections of different dimensions. The die body 10 is provided with a punch 13 sealed to it by means of a sylphon 14 or other suitable means to form an airtight seal and permit reciprocation of the punch. The punch is shaped to conform with the internal opening of the container which, in this embodiment, is cylindrical. For introducing hydrogen into the system, the die body is provided with ducts 16 and 17 which communicate with cooperating holes in the hydride container when it is in position in the die body. For heating the inner chamber, the die body 10 is provided with conduction heating coils 18 or other suitable heating means. The temperature can be controlled by means of a suitable thermocouple (not shown) located adjacent the reaction chamber. In order to form a gastight seal for the hydride container, a tapered, slightly over-sized cap 19 conforming to the shape of the internal opening of the container is provided to be press fitted into the container by pressure applied with punch 13. To permit removal of the hydride container after sealing, removable plug 21 is provided in the bottom of die body 10. To insure a gastight seal, a gasket 22 is provided between the plug 21 and the die body. Plug 21 has a reentrant portion serving as a part of the forming chamber.

The operation of the apparatus is as follows: An amount of uranium metal sufficient to produce the desired size compact is placed in hydride container 11 inside the chamber. The hydride container is evacuated and argon gas passed through the system to insure an inert atmosphere inside the container. The system is then purged with hydrogen until all argon is removed, and sealed off at a pressure corresponding to the desired amount of hydrogen. The container is heated to about 225° C. to initiate the reaction between hydrogen and uranium while the total amount of hydrogen absorbed in the system is noted by following the pressure drop. When a stoichiometric amount of hydrogen has been absorbed, indicating that the reaction is complete, the container is heated to between 250° C. and 300° C. and pressure is applied to the container cap 19 by means of punch 13 to force the cap downward and to compress the formed hydride into a high density compact. The pressure used is in the neighborhood of twenty tons per square inch. It is believed that the use of high mechanical pressures makes possible the use of high temperatures without dissociation of the hydride. Plug 21 is then removed and container 11 taken from the die body and sawed off above the cap. The sealed compact produced may be moved from place to place and used in neutronic systems in the container, thus avoiding exposure of the hydride to air.

Although the invention has been illustrated by a preferred embodiment thereof, it is by no means limited to this particular modification. For example, various shaped compacts may be made by correspondingly varying the shape of forming plug 21 and the container bottom or the shape of the cap 19 and the punch 13. Although an application of the invention to the making of uranium hydride has been described, it is equally applicable to the making of any compact which cannot be exposed to air. It is particularly adapted to the making of hydride compacts of other second rare earth series metals, such as thorium and plutonium.

Uranium hydride compacts having a density as high as 7.75 grams per cubic centimeter have been obtained with the above method and apparatus. A 3 to 5 percent increase in density is obtained by raising the temperature to approximately 300° C. and maintaining a given reaction pressure for four to six hours. Examination of compacts formed in this manner showed that the increased density is due to an unexpected increase in grain growth: 11 percent of the powder produced during a run made in the above manner was coarser than 50 mesh, while powder obtained by ordinary methods is finer than 325 mesh.

Various analyses have shown that the product produced by the method of this invention has superior characteristics. Radiographic inspection of cylindrical shapes produced has shown a uniform section free from voids and non-homogeneity. X-ray diffraction data proved that the material is pure uranium hydride; no evidence of oxide has been detected. Finished sealed shapes have been tested by leaving them exposed to the atmosphere for periods of four to nine weeks. These shapes were weighed periodically and inspected for dimensional changes or distortion. In all specimens tested, there was no distortion measurable or gain in weight. Investigations of powder from compacts powdered by ball-milling in argon have shown that the powder produced has a 33 percent higher apparent density than powder produced by prior processes. Also, 15 percent of the particles are larger in size than those in conventionally produced powder. In addition, the powdered material from compacts made by the present processes is much less pyrophoric than ordinary uranium hydride powder. In fact, this powder can be exposed to the atmosphere without spontaneous ignition in contrast to that produced by prior methods. The unexpected qualities of this powder appear to be due to enhanced crystal growth resulting from the combined use of high temperatures and high mechanical pressures in compressing the formed hydride into compacts. The high mechanical pressures permit the use of temperatures far in excess of that at which the hydride would dissociate under ordinary conditions. It is believed that an oriented crystal growth is achieved when operating under the above conditions with a result that the usual difficulties encountered in compacting non-plastic particulate matter appear to be decreased and a higher density powder and compact are achieved.

It is thus seen that there has been disclosed a method and apparatus for producing compacts of uranium hydride of high purity and density which avoid the disadvantages connected with prior processes and which are highly effective.

While a preferred embodiment of the invention has been disclosed, it is to be understood that the invention is by no means limited to this embodiment, as various modifications within the scope of the appended claims will be readily apparent to those skilled in the art.

What is claimed is:

1. The method of making canned compacts of pyrophoric metal hydrides out of contact with the air which comprises enclosing a metal in a container, removing air from the container and metal, admitting a sufficient amount of hydrogen to the container to convert all of the metal to the metal hydride, heating the container to initiate reaction between the metal and hydrogen, whereby the metal is converted to a hydride, and then simultaneously sealing the container and compressing the formed hydride without removal of the hydride therefrom; whereby a metal hydride is formed, compressed into a compact and sealed in a container out of contact with the air in an integral operation.

2. The method of claim 1 in which the metal is a second rare earth series metal.

3. The method of making canned uranium hydride compacts out of contact with the air which comprises enclosing metallic uranium in a container, removing air from the metal and container, admitting sufficient hydrogen to the container to convert all of the uranium to uranium hydride, heating the container to a temperature of about 225° C. to initiate the reaction between the uranium and hydrogen, and when the reaction is completed simultaneously compressing the formed hydride and sealing the container without removal of the hydride therefrom; whereby uranium hydride is formed, compressed into a compact and sealed in a container out of contact with the air in an integral operation.

4. The method of making canned uranium hydride compacts out of contact with the air which comprises enclosing metallic uranium in a container, removing air from the metal and container, admitting sufficient hydrogen to the container to convert all of the uranium to uranium hydride, heating the container to a temperature of about 225° C. while maintaining therein a reaction pressure of about 10 pounds per square inch from about four to six hours until the reaction is completed, and then simultaneously compressing the formed hydride and sealing the container without removal of the hydride therefrom; whereby uranium hydride is formed, compressed into a compact and sealed in a container out of contact with the air in an integral operation.

5. The method of claim 3 in which a pressure of about 20 tons per square inch is used to compress the formed hydride and a temperature of between 250° C. and 300° C. is maintained while said pressure is being applied.

6. Apparatus for preparing, compacting and canning a metal compound out of contact with the air in an integral operation which comprises a die body, means for heating said die body, a reaction and forming chamber located centrally of said die body, a removable container in said chamber adapted to hold metal, means for passing gas through said container to form a compound with the metal contained therein, sealing means for said container, means attached to said die body in an airtight manner for simultaneously sealing said can and compressing the compound formed therein, and a removable plug in the bottom of said die body having an inner surface constituting a part of said forming chamber.

7. Apparatus for preparing, compacting and canning a metal hydride out of contact with the air in an integral operation which comprises a die body, means for heating said die body, a reaction and forming chamber located centrally of said die body, said chamber having a lower section of larger cross section than the upper section, a punch adapted to reciprocate in said can for compressing material therein, said punch attached to said die body in an airtight manner, a container adapted to hold metal disposed in the lower section of said chamber having an outer surface conforming substantially to the inner surface of said lower section and an internal opening conforming to the shape of said punch, a removable forming plug in the bottom of said die body, the inner surface of said plug forming a part of said reaction and forming chamber, at least one inlet and outlet duct passing from said container through said die body for introducing hydrogen into said can and a sealing cap slidably positioned in said container below said punch and above said ducts; whereby in an integral operation out of contact with the air hydrogen may be introduced into said container to react with a metal therein to form a hydride of said metal which may then be compressed and sealed in the container.

References Cited in the file of this patent

UNITED STATES PATENTS 2,558,377     Perlman et al. _____ June 26, 1951